Dec. 1, 1936.  A. J. MEYER  2,062,369
ENGINE
Filed June 11, 1929
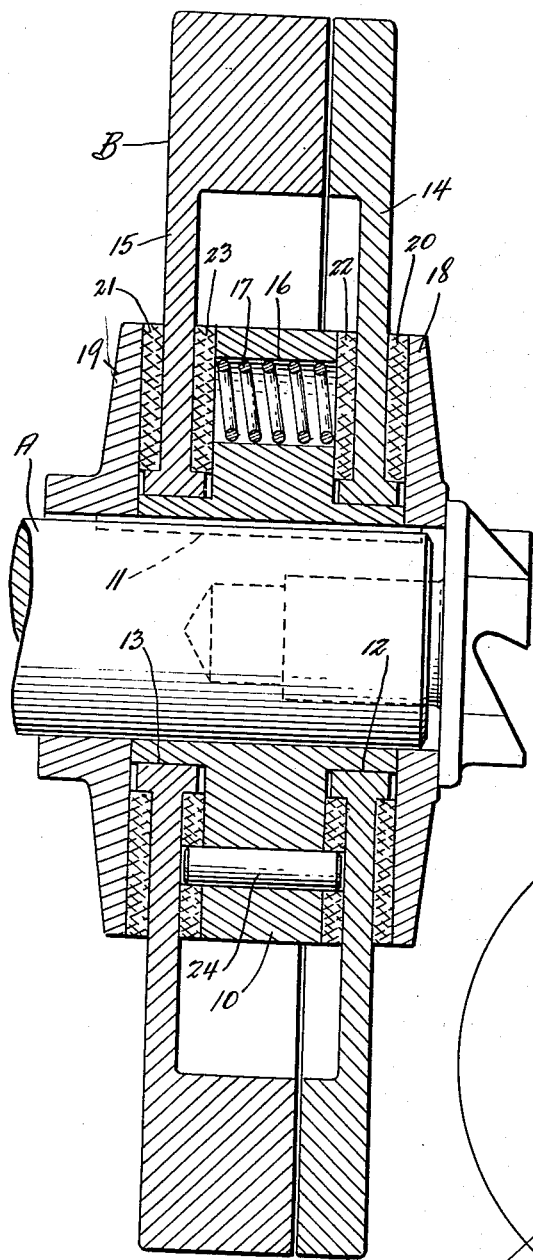
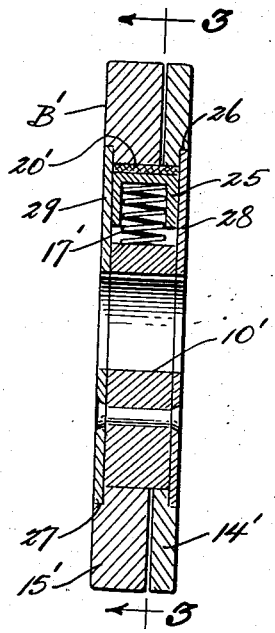
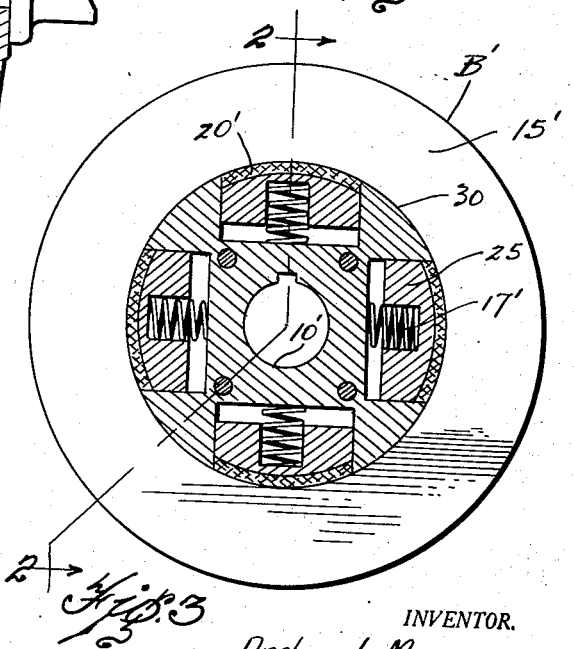
INVENTOR.
Andre J. Meyer
BY W. W. Harris
ATTORNEY.

Patented Dec. 1, 1936

2,062,369

UNITED STATES PATENT OFFICE 2,062,369

ENGINE

Andre J. Meyer, Detroit, Mich., assignor to Continental Motors Corporation, Detroit, Mich., a corporation of Virginia Application June 11, 1929, Serial No. 370,085

10 Claims. (Cl. 74—574)

This invention relates to engines and refers more particularly to vibration dampers for crankshafts of engines particularly of the internal combustion type. My invention provides improvements over the well known "Lanchester" damper and like the Lanchester damper is adapted for cooperation with the usual flywheel at the rear of the crankshaft. My damper in the embodiment illustrated is adapted to be located at the crankshaft front end and is designed to damp the torsional vibrations of the crankshaft, these vibrations being objectional especially in multi-cylinder internal combustion engines such as are commonly used for propelling motor vehicles.

Heretofore in dampers of the aforesaid type, the auxiliary damper flywheel is yieldingly connected to the crankshaft, a spring regulating and determining the amount of friction resistance to yielding in the damping operation. I have determined that this device is unsatisfactory as ordinarily constructed in that the damper does not function properly for the range of speeds ordinarily experienced in engines of the character referred to. The spring or springs heretofore used if set properly for damping low speed high frequency crankshaft vibrations will be too stiff for properly damping high speed low frequency vibrations. As a result the usual dampers are inefficient and unsatisfactory.

One object of my invention resides in the provision of a damper which will properly damp the vibrations over the whole range of speeds. A further object resides in the provision of an improved damper of simple construction capable of manufacture at low cost.

Further features and advantages of my invention will be apparent from the following description of the details of construction illustrated in the accompanying drawing in which, Fig. 1 is a sectional elevation view through my improved damper, Fig. 2 is a similar view of a modified construction along the line 2—2 of Fig. 3, and Fig. 3 is a view of the modified construction along the line 3—3 of Fig. 2.

Reference character A represents the crankshaft front end and B my damper mounted thereon. The damper comprises a hub 10 keyed at 11 to the crankshaft and provided with shouldered annular bearings 12, 13. Rotatably mounted on shoulders 12, 13 are the flywheels or flywheel portions 14, 15 of different mass or inertia, the purpose of which will be presently apparent. The hub 10 has an annular series of pockets 16 containing springs 17 serving to urge the flywheel portions 14, 15 apart. An outer abutment 18 limits axial movement of flywheel 14 and a second abutment 19 limits axial movement of flywheel 15. The abutments 18, 19 are preferably fixed to rotate with crankshaft A and in the illustration engage key 11. Between the flywheel portions and abutments is located friction material 20, 21, and additional friction material 22, 23 may be located between springs 17 and the flywheels. The friction material 22, 23 may be doweled by pins 24 with hub 10 and supplements the material 20 and 21 in increasing the efficiency of the damping action.

In operation the hub 10 rotates in fixed relation to the crankshaft A while flywheel B is rotated therewith by reason of the friction material 20, 21 and 22, 23. When the crankshaft is free from the angular vibrations, either positive or negative, the flywheel B rotates as a unit with the hub 10. However when the crankshaft tends to quickly change its angular velocity as in torsional vibrations, the inertia of the flywheel tends to oppose such changes and the vibrations are thus damped out or dissipated.

In considering the action of my damper it will be noted that the product of its mass moment of inertia I and the angular acceleration $\theta''$ will increase as the angular acceleration increases and there will be some value of $\theta''$ where this product will equal the friction moment M of the damper, this friction moment being a constant determined by the tension of the springs 17 and effectiveness of the friction material 20, 21, 22, and 23. For such a value of $\theta''$ $M = I\theta''$.

From this it will be noted that for a higher value of $\theta''$ a lower value of I will overcome the friction moment M. Of course if a high value of I is available then the friction moment M will also be overcome. Therefore at low speed where $\theta''$ is high both flywheels 14, 15 will slip together. At high speed where $\theta''$ is much smaller the flywheel portion 14 of relatively small mass remains stationary relative to the crankshaft and the flywheel portion 15 of relatively great mass will slip alone.

Heretofore with the single flywheel construction the proportion of inertia to friction moment is determined experimentally at high speed. A damper so made will be active at all speeds. However, the friction torque is insufficient to take care of the high energy of the high frequency vibrations at low speeds. My invention supplies additional friction moment when high frequency vibrations occur, and with my damper the whole speed range is adequately provided for.

The same desirable results may also be obtained following the teachings of my invention in other ways. For example in Figs. 2 and 3 I have shown a modified arrangement of parts in which hub 10' is driven as before from the crankshaft and flywheel B' as before is comprised of portions 14' and 15' of different mass. In this modification springs 17' act radially against shoes 25 and friction material 20', the flywheel portions being loosely centered by shoulders 26, 27 and end plates 28, 29 assisted somewhat by hub portions 30. The operation of the flywheel portions is the same as previously described in connection with the embodiment illustrated in Fig. 1.

While I have illustrated my invention as having a pair of flywheel members it is apparent that more than two of such members may be employed if desired within the scope of my invention.

What I claim as my invention is:

1. A device of the character described comprising in combination with an engine crankshaft, a driving hub fixed to one end of the crankshaft, driven flywheel members coaxial with the hub and relatively rotatable with respect to each other about the hub, and means yieldingly connecting the flywheel members with the hub, said yielding connecting means including a spring urging said flywheel members axially of the crankshaft.

2. A device of the character described comprising in combination with an engine crankshaft, a driving hub fixed with the crankshaft, driven flywheel members coaxial with the hub and relatively rotatable with respect to each other about the hub, and means yieldingly connecting the flywheel members with the hub, said yielding connecting means including a spring tending to separate said flywheel members to provide a yielding driving connection between the flywheel members and crankshaft.

3. A vibration damper comprising in combination, a crankshaft, a hub on the crankshaft, solid flywheel portions spaced axially with respect to each other, said hub having a flange projecting intermediate said spaced flywheel portions, mats of friction material interposed between said flange and said flywheel portions, a spring carried by said hub flange and constructed for exerting a force in a direction parallel to the crankshaft axis acting in conjunction with said mats to yieldingly engage said flywheel portions with said driving hub, said flywheel portions adapted for relative angular movement during damping action.

4. In a vibration damper for engine shafts, a hub adapted to be secured to the engine shaft, abutment means associated with and supported against relative angular and axial movement with respect to said hub, a plurality of solid inertia members of different masses supported for relative rotatable movement about said hub, friction devices for drivingly connecting said inertia members with the abutment means, and spring means for yieldingly engaging said inertia members with said friction devices.

5. In a vibration damper for engine shafts, a hub adapted to be secured to the engine shaft, abutment means associated with and supported against relative angular and axial movement with respect to said hub, a plurality of solid inertia members of different masses supported for relative rotatable movement about said hub, friction devices for drivingly connecting said inertia members with the abutment means, and common spring means for yieldingly engaging both said inertia members with said friction devices.

6. In a vibration damper for engine shafts, a hub adapted to be secured to the engine shaft, abutment means associated with and supported against relative angular and axial movement with respect to said hub, a plurality of solid inertia members of different masses supported for relative rotatable movement about said hub, friction devices for drivingly connecting said inertia members with the abutment means, and a plurality of spring devices acting to yieldingly pack said inertia members, friction devices and said abutment means.

7. In a vibration damper for engine shafts, a hub adapted to be secured to the engine shaft, a plurality of solid inertia members constructed of different masses supported for relative rotatable movement about said hub, friction means for resisting rotation of the inertia members with respect to said hub, and spring means for yieldingly engaging said inertia members with said friction means.

8. In a vibration damper for engine shafts, a hub adapted to be secured to the engine shaft, a plurality of solid inertia members constructed of different masses supported for relative rotatable movement about said hub, friction means for resisting rotation of the inertia members with respect to said hub, and a plurality of spring means angularly spaced about the hub for yieldingly engaging said inertia members with said friction means.

9. In a vibration damper for engine shafts, a hub adapted to be secured to the engine shaft, a plurality of solid inertia members constructed of different masses supported for relative rotatable movement about said hub, friction means for resisting rotation of the inertia members with respect to said hub, and spring means for yieldingly engaging said inertia members with said friction means, said spring means exerting a force tending to move said inertia members axially of the hub into engagement with said friction means.

10. In a vibration damper for engine shafts subjected to torsional vibrations of different frequencies, driving means fixed to said shaft, a plurality of damping devices including inertia members of different masses for damping torsional vibrations of different frequencies, separate friction means intermediate each of said inertia members and said driving means, and spring means yieldingly urging said inertia members into frictional contact with said friction means.

ANDRE J. MEYER.